(12) United States Patent
Kato et al.

(10) Patent No.: US 6,930,476 B2
(45) Date of Patent: Aug. 16, 2005

(54) POSITION DETECTING DEVICE (75) Inventors: Yasuhiko Kato, Tokyo (JP); Sotsuo Miyoshi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/915,343

(22) Filed: Aug. 11, 2004

(65) Prior Publication Data
US 2005/0046415 A1 Mar. 3, 2005

(30) Foreign Application Priority Data
Sep. 3, 2003 (JP) ........................................ 2003-311680

(51) Int. Cl.[7] ................................................ G01B 7/14
(52) U.S. Cl. ............................ 324/207.24; 324/207.26; 324/244
(58) Field of Search ..................... 324/207.11–207.13, 324/207.15, 207.16–207.26, 244, 246, 251, 260–262, 173–174

(56) References Cited

U.S. PATENT DOCUMENTS

2002/0089324 A1 * 7/2002 Miyata et al. ............ 324/207.2
2003/0184186 A1 * 10/2003 Fukushima et al. ......... 310/261

FOREIGN PATENT DOCUMENTS

| JP | 7-500421 A | 1/1995 |
|---|---|---|
| JP | 2201-074409 A | 3/2001 |
| WO | WO 93/23720 A1 | 11/1993 |

* cited by examiner

Primary Examiner—Bot Ledynh
(74) Attorney, Agent, or Firm—Sughrue Mion, PLLC (57) ABSTRACT

A first magnetic substance and a second magnetic substance are arranged opposite to each other with a gap left therebetween; a holding member being arranged in the gap; a magnetic field generator being secured to the holding member; the generator being arranged adjacent to the first magnetic substance or the second magnetic substance, thereby increasing an magnetic attraction generated by a magnetic force between the generator and the first magnetic substance or the second magnetic substance. A slide between a sliding portion of a supporting member and that of the holding member is permitted only on the magnetic substance side to which the magnetic field generator stands close, which relaxes the requirements of dimensional accuracy such as the height of the holding member.

11 Claims, 4 Drawing Sheets

POSITION DETECTING DEVICE

BACKGROUND OF THE INVENTION

1. Field of the Invention

The present invention relates to a position detecting device that is able to prevent from detecting falsely a position and avert damage by external vibrations.

2. Description of the Related Art

For example, JP(PCT)7-500421A discloses a position detecting device including a magnetic field generator which generates a magnetic field; a holding member which connects the magnetic field generator and an object whose position is to be detected (to-be-detected object), and is movable together with the generator in the position detecting direction; a first magnetic substance and a second magnetic substance which are arranged opposite to each other with a predetermined gap left therebetween so as to sandwich the holding member; a supporting member which supports these first magnetic substance and second magnetic substance; and a magnetic sensor which is inserted in a gap formed in either of the first magnetic substance and the second magnetic substance, and detects a position of the holding member, i.e., the to-be-detected object based on a magnetic flux passing through the magnetic substance into the gap of which the sensor is inserted, for detecting a position of the to-be-detected object that is to be in linear motion.

The magnetic field generator is magnetized so as to generate a magnetic field forming a clockwise magnetic path and a counterclockwise one with respect to each of the first magnetic substance and the second magnetic substance, and the positions of the magnetic paths shift depending on where the magnetic field generator is poisoned (i.e., a position of the to-be-detected object). The shift of the magnetic path changes a density and a direction of the magnetic flux passing through the magnetic sensor, and the magnetic sensor outputs a signal corresponding to the density and the direction of the magnetic flux. The output signal is a signal indicative of the position of the object to be detected and has a linear relationship to the position. Therefore, an output signal of the magnetic sensor enables to detect where an object is moved.

Moreover, the magnetic field generator is secured to the holding member so as to be disposed in the center of the gap between the first magnetic substance and the second magnetic substance.

Further, the holding member to which the magnetic field generator is secured slidably moves through a sliding part provided on the holding member along sliding parts provided on the supporting member supporting the first magnetic substance and the second magnetic substance. In this case, each side of the first magnetic substance and the second magnetic substance participate in the slide.

Since the conventional position detecting device is arranged as mentioned above, and particularly the magnetic field generator is disposed in the center of a gap between the first magnetic substance and the second magnetic substance, strengths of the magnetic force generated between the magnetic field generator and the first magnetic substance, and between the generator and the second magnetic substance are almost equal. For this reason, the magnetic field generator will be placed in an unstable position to an external force. The generator is susceptible to a swing, e.g., when a vibration is applied from the outside. Specifically, when a vibration is applied in the position detecting direction, the generator swings and the holding member cannot keep connection with the object to be position-detected in the worst case, resulting in false detection of the position.

Moreover, when the generator swung, e.g., in the direction of the first magnetic substance or the second magnetic substance, the generator collides against the first magnetic substance or the second magnetic substance in the worst case, or else the holding member which holds and secures the generator collides with the supporting member which supports the first magnetic substance and the second magnetic substance. This can damage the generator according to circumstances.

As a method of preventing the generator from being swung, there can be a method of applying a large load to the generator in advance in the position detecting direction in the event that an external force is applied, and a method of reducing spaces between the generator and the first and second magnetic substances, and between the holding member and the first and second magnetic substances as much as possible such that the generator or the holding member does not greatly deviate from the original position detecting direction. However, when these methods are taken, it brings about an unduly raised production cost and lowered productivity because these methods require an addition of load applying means and an increase in the dimensional precision of the components.

SUMMARY OF THE INVENTION

The present invention has been made to solve the above-mentioned problems. An object of the present invention is to provide a position detecting device which has high productivity good for mass production and is inexpensive in which, even when a vibration is applied from the outside, it prevents its magnetic field generator from being swung in a direction parallel to the position detecting direction and in a direction parallel to the direction in which components of a magnetic force of the magnetic field generator is generated (in the direction of the first or second magnetic substance) thereby outputting a high-precision signal to avoid detecting falsely the position, as well as preventing the magnetic field generator from colliding with other members to avert damage to the generator; and relaxing the requirements of the dimensional precision in the components.

The position detecting device according to one aspect of the present invention includes a first magnetic substance and a second magnetic substance arranged opposite to each other with a gap left therebetween, and supported by a supporting member; a magnetic field generator arranged adjacent to the first magnetic substance or the second magnetic substance in the gap, for forming a magnetic path with these first magnetic substance and second magnetic substance; a holding member that holds and secures the magnetic field generator thereon, and is movable relative to the first magnetic substance and the second magnetic substance; and a magnetic sensor inserted in the gap formed in the first magnetic substance or the second magnetic substance, for outputting a signal representative of a relative positional relationship among the first magnetic substance, the second magnetic substance, and the holding member based on magnetic flux passing through the magnetic path that undergoes a change due to a relative shift therebetween.

Through the claimed arrangement according to the present invention including the first magnetic substance and the second magnetic substance arranged opposite to each other with a gap left therebetween, and supported by the supporting member; the magnetic field generator arranged adjacent to the first magnetic substance or the second magnetic substance in the gap, for forming a magnetic path with these first magnetic substance and second magnetic substance; the holding member that holds and secures the magnetic field generator thereon, and is made movable relative to the first magnetic substance and the second magnetic substance; and the magnetic sensor inserted in the gap formed in the first magnetic substance or the second magnetic substance, for outputting a signal indicative of a relative positional relationship between the first magnetic substance, the second magnetic substance, and the holding member based on a magnetic flux passing through the magnetic path that undergoes a change by the relative shift therebetween, the claimed invention increases a magnetic attraction generated by the magnetic force between the magnetic field generator and the first magnetic substance and the second magnetic substance adjacent thereto; keeps the magnetic field generator in tight contact with the first magnetic substance and the second substance, and augments a friction force between the swing portion of the supporting member and that of the holding member. Thereby, when applied a vibration from the outside, the magnetic field generator is prevented from being swung in a direction parallel to the position detecting direction and in a direction parallel to the direction in which the component of the magnetic force of the magnetic field generator is generated. Resultingly, the magnetic sensor outputs a high-precision signal to prevent the position from being detected falsely, and avert damage to the magnetic field generator caused by a collision with the first magnetic substance and the second magnetic substance.

DETAILED DESCRIPTION OF THE PREFERRED EMBODIMENTS

Preferred embodiments of the present invention will now be described below with reference to the attached drawings.

First Embodiment

Figure 1A:
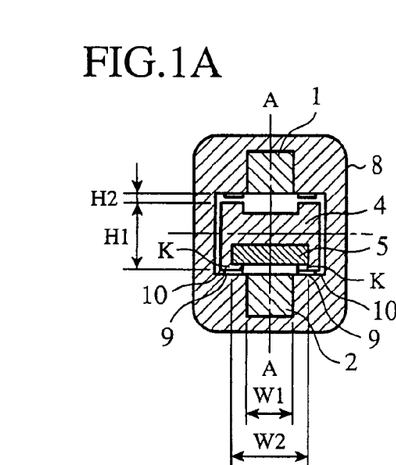
FIG. 1A is a lateral cross sectional view of a position detecting device according to a first embodiment of the present invention.
Figure 1B:
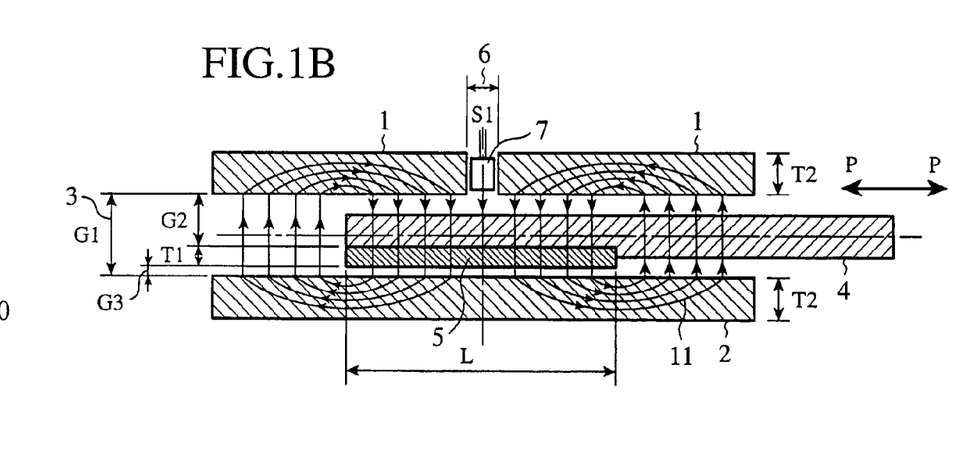
FIG. 1B is a longitudinal cross sectional view taken along the A—A line of FIG. 1A.

FIG. 1A is a lateral cross sectional view of a position detecting device according to the first embodiment of the present invention. FIG. 1B is a longitudinal cross sectional view taken along the A—A line of FIG. 1A.

Referring to FIG. 1B, the position detecting device includes a first magnetic substance 1 and a second magnetic substance 2 each having a flat or a long shape, which are arranged opposite to each other with a gap 3 left therebetween; a holding member 4 made of non-magnetic material, which is arranged in the central position in the height direction of the gap 3; and a flat magnetic field generator 5 which generates a magnetic field, and is secured on one side of the holding member 4 so as to be adjacent to the second magnetic substance 2.

The magnetic field generator 5 is magnetized so as to generate a magnetic field forming a clockwise magnetic path and a counterclockwise one with respect to the first magnetic substance 1 and the second magnetic substance 2.

The first magnetic substance 1 is formed a gap 6; a magnetic sensor 7 is inserted in the gap 6 to detect magnetic flux passing through the magnetic sensor 7 via the first magnetic substance 1.

Moreover, as shown in FIG. 1A, the first magnetic substance 1 and the second magnetic substance 2 are supported by a supporting member 8 made of non-magnetic material, and the holding member 4 has a substantially H shaped cross section.

It is arranged that the sliding portion 9 of the supporting member 8 and the sliding portion 10 of the holding member 4, shown in FIG. 1A, slide in the position detecting direction shown by the bidirectional arrow P—P of FIG. 1B, and that the relative positional relationship between the first magnetic substance 1, the second magnetic substance 2, and the holding member 4 to which the magnetic field generator 5 is secured is changed by a linear motion. In this case, either of the first magnetic substance 1 and the second magnetic substance 2, or the holding member 4 is fixed in position, and the other of which is made movable. In fact, no matter which is fixed in position or made movable, the relative positional relationship between both retains unchanged, with the result that it fully functions as a position detecting device. The change in the relative positional relationship aims at detecting thereof.

For example, by fixing the pair of the first magnetic substance 1 and the second magnetic substance 2 in position; making the holding member 4 on which the magnetic field generator 5 movable by the above-described slide; and connecting the object to be position-detected with the holding member 4, the holding member 4 moves following a change of the position of the object. The movement of the position of the holding member 4 changes a density and a direction of magnetic flux passing through the magnetic sensor 7, and outputs an electric signal S1 corresponding to the change from the magnetic sensor 7. This output signal varies in a linear relationship to a change of the position, and the output signal enables detection of the position of the to-be-detected object.

Here, a mention is made as to whether a difference is present or absent between outputs of the magnetic sensor 7 in the case where the magnetic field generator 5 is arranged adjacent to the second magnetic substance 2 as discussed above, and in the conventional case where the generator 5 is disposed in the center in the height direction in the gap 3 between the first magnetic substance 1 and the second magnetic substance 2. In these cases, no change is appeared in the amount of flux passing through the magnetic sensor. This is because a relative position of the magnetic field generator 5, the first magnetic substance 1, and the second magnetic substance 2 in the direction where the component of the magnetic field of the generator 5 is generated does not show any change. Accordingly, no change is observed in an output of the magnetic sensor.

The first magnetic substance 1 and the second magnetic substance 2 both are adopted stacked flat magnetic steel sheets in order to prevent generation of an eddy current on the surfaces thereof. When assumed that the gap 3 between the first magnetic substance 1 and the second magnetic substance 2 have a length of G1=2.8 mm, for example, and that the magnetic field generator 5 (T1=1–2 mm (described later)) is inserted into the gap 3; gaps between the magnetic field generator 5 and the first magnetic substance 1 and between the magnetic field generator 5 and the second magnetic substance 2, shown in FIG. 1B, come to G2=1.0 mm and G3=0.6 mm, respectively. Thus, the device is designed so as to achieve easy passing of the magnetic flux.

Further, the thickness T2 of each of the first magnetic substance 1 and the second magnetic substance 2, i.e., the dimension T2 in a direction parallel to the direction in which the magnetic field is generated by the generator 5 has to design for the magnetic flux generated by the generator 5 not to saturate within the first magnetic substance 1 and the second magnetic substance 2.

Moreover, in the event that the magnetic field generator 5 is formed of rectangular magnet of samarium-cobalt series. The dimensions of the generator are set as a design example as follows: the thickness T1, i.e., the dimension T1 of the generator 5 in a direction parallel to the direction in which the magnetic field is generated, is 1.2 mm, for example, and the length L in a longitudinal direction, i.e., the dimension L thereof, which is in a direction parallel to the position detecting direction (P—P) is adjusted to 20.3 mm, adding an allowance, if the detection distance is set to 15 mm.

The dimensions such as thickness T1 and the length L of the generator 5, the dimension G1 of the gap 3 between the first magnetic substance 1 and the second magnetic substance 2, the dimensions G2 and G3 of the gaps between the generator 5 and the first magnetic substance 1, and between the generator 5 and the second magnetic substance 2 discussed in the above are given by way of a mere example and not limited thereto.

It is preferable that the depths W1, W2 of each of the first magnetic substance 1 and the second magnetic substance 2, and the generator 5, that is, the dimension W1 in a direction perpendicular to the direction in which the magnetic field is generated by the generator 5, and the dimension M2 in a direction perpendicular to the position detecting direction are different from each other. However, the depth W2 of the generator 5 may be larger than the depth W1 of each of the first magnetic substance 1 and the second magnetic substance 2 (W2>W1). Conversely, the depth W1 of the first magnetic substance 1 and the second magnetic substance 2 may be larger than the depth W2 of the generator 5 (W1>W2). FIG. 1A is a view illustrating the case in which the relationship is W2>W1.

In addition, as shown in FIG. 1A, the generator 5 is secured to the holding member 4. The securing methods may be selected from those involving securing the generator 5 to the holding member 4 with adhesive; securing by insert-molding the generator and burying the generator in the holding member; securing the generator 5 with an elastic force of the holding member that posses an elastic force inherently; or securing by deforming the holding member so as not to drop the generator after the generator 5 is fitted into the holding member (K portion of FIG. 1A).

The magnetic sensor 7 is designed to include a temperature detecting element, use a Hall device with an ASIC (Application Specific Integrated Circuit) in which a zero point and a gradient of an output is adjusted internally in the Hall IC, and thus can output a signal without fluctuations even in a hot environment.

The magnetic field generator 5 is secured to the holding member 4 so as to be arranged adjacent to the second magnetic substance 2 as previously stated.

One of the features of the present invention is in that the magnetic field generator 5 is arranged adjacent to the second magnetic substance 2. This proximate arrangement increases an magnetic attraction generated by a magnetic force between the generator 5 and the second magnetic substance 2 adjacent to the generator, thereby allowing the generator 5 to be tightly clung the second magnetic substance 2, as well as increasing a frictional force when sliding between the sliding portion 9 of the above-mentioned supporting member 8 and the sliding portion 10 of the holding member 4. The increased frictional force prevents a swing of the generator 5 generated by external vibrations.

Moreover, the increased magnetic attraction brought about by the proximate arrangement of the generator 5 requires to slide between the sliding portion 9 of the supporting member 8 and the sliding portion 10 of the holding member 4 only on the second magnetic substance 2 side adjacent to which the generator 5 is arranged as shown in FIG. 1A, but does not to do so on the first magnetic substance 1 side.

Thus, the slide between the sliding portion 9 of the supporting member 8 and the sliding portion 10 of the holding member 4 is required only on one side. This relaxes the requirements of strict dimensional accuracy of the height H1 of the holding member 4 or the gap H2 between the holding member 4 and the supporting member 8, shown in FIG. 1A. It eliminates the need for the holding member 4 and the supporting member 8 to be highly precise in dimension, which facilitates manufacture of these members with enhanced the productivity of the device.

Additionally, it is preferable to employ material (resinous material or the equivalent) having high slidabiliy and high strength for the holding member under the necessity that the holding member 4 slides via its sliding portion 10 on the sliding portion 9 of the supporting member 8, and at the same time holds the magnetic field generator 5. As a candidate for the material, it is desirable to use fluorine containing PPS (polyphenylene sulfide) material, for example.

Further, the use of the resinous material similar to that of the holding member 4 for the sliding portion 9 of the supporting member 8 improves the sliding characteristics between the sliding portion 9 of the supporting member 8 and the sliding portion 10 of the holding member 4.

In the above-described configuration shown in FIG. 1A and FIG. 1B, the magnetic field generator 5 is arranged adjacent to the second magnetic substance 2. Instead, a configuration may also be taken in which the generator 5 is arranged adjacent to the first magnetic substance 1.

This configuration has the advantage of increasing the magnetic attraction between the first magnetic substance 1 and the generator 5, which exerts the same effect as with the configuration where the generator is arranged adjacent to the second magnetic substance 2.

Therefore, it is enough to slide between the sliding portion 9 of the supporting member 8 and the sliding portion 10 of the holding member 4 only on the first magnetic substance 1 side.

In addition, although in FIG. 1A and FIG. 1B, the magnetic sensor 7 is provided in the gap 6 of the first magnetic substance 1, as an alternative, it may be formed a similar gap (not shown) in the second magnetic substance 2 to insert the sensor 7 therein.

The operation of the position detecting device will now be described reefing to FIGS. 2A, 2B, and 2C.

Figure 2A:
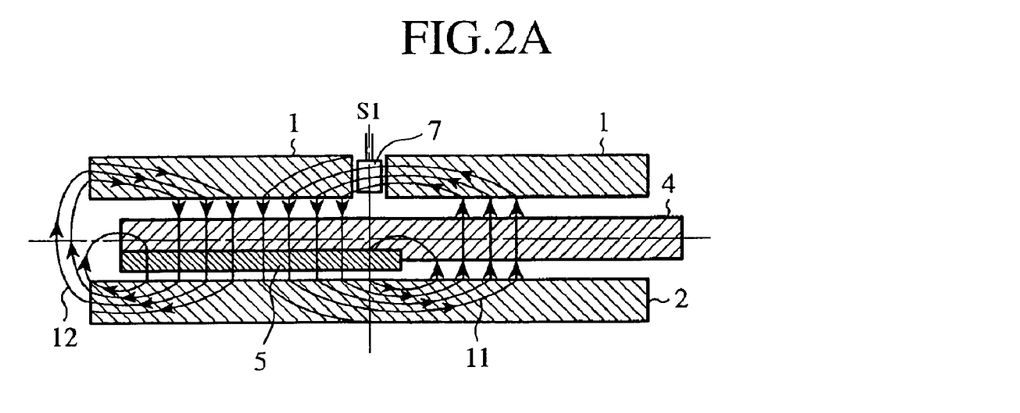
FIGS. 2A, 2B, and 2C are longitudinal cross sectional views for explaining an operation of the position detecting device according to a first embodiment.
Figure 2B:
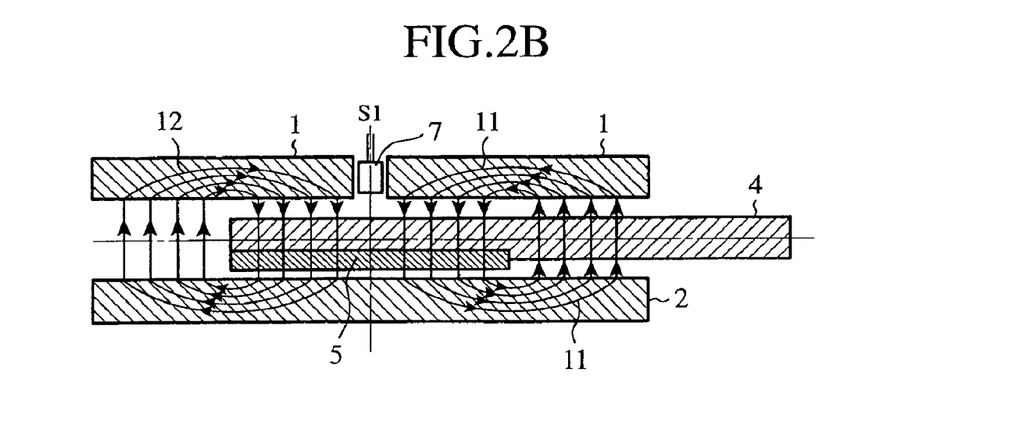
Figure 2C:
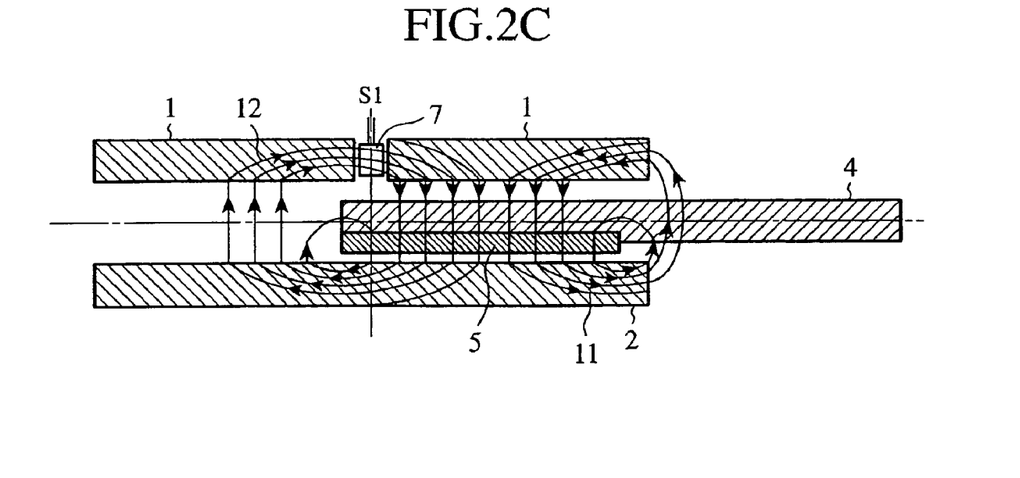

FIGS. 2A, 2B, and 2C are longitudinal cross sectional views of the position detecting device according to the first embodiment, in which the relative positional relationship between the first magnetic substance 1, the second magnetic substance 2, and the holding member 4 (including the magnetic field generator 5) is being illustrated with the relationship shown in FIG. 1B changed.

From the positional relationship between the generator 5 and the magnetic sensor 7, it can easily be seen that FIG. 2A is the view of the position detecting device in the state where the generator 5 is moved toward the left with respect to the magnetic sensor 7; FIG. 2B is the view of the same in the state where the generator 5 is located in the center with respect to the sensor 7; and FIG. 2C is the cross sectional view of the same in the state where the generator 5 is moved toward the right with respect to the sensor 7.

The permission of the object to be position-detected (to-be-detected object) to be connected to either of the holding member 4 side and the first magnetic substance 1 and the second magnetic substance 2 side, whose relative positional relationship suffers a change is as already stated above. At that time, one side to which the to-be-detected object is connected is made movable, and the other side to which the to-be-detected object is not connected is fixed in position. In general, it is a custom for the to-be-detected object to connect with the holding member 4 side, and for the first magnetic substance 1 and the second magnetic substance 2 to fix in position.

Moreover, as previously stated, the generator 5 generates the magnetic field forming a clockwise magnetic path and a counterclockwise one with respect to the first magnetic substance 1 and the second magnetic substance 2 as shown in FIGS. 2A, 2B, and 2C.

The above-mentioned magnetic paths move following a change of position of the to-be-detected object, thus changing a density and a direction of the magnetic flux passing through the magnetic sensor 7 in keeping with the movement thereof. FIG. 2A shows the state in which the counterclockwise magnetic flux 11 is passing through the sensor; FIG. 2B shows the state in which no magnetic flux is passing through the sensor because the sensor is located between the clockwise and counterclockwise magnetic paths; and FIG. 2C shows the state in which the clockwise magnetic flux 12 is passing through the sensor.

However, FIGS. 2A, 2B, and 2C show typical states. It is not necessary to say that there can actually be the state between the state shown in FIG. 2A and FIG. 2B, and the state between the state shown in FIG. 2B and FIG. 2C according to a change of the position of the to-be-detected object. Naturally, the density of the magnetic flux is different depending on in which state the to-be-detected object is.

Therefore, the magnetic sensor 7 outputs a signal S1 corresponding to movement of the position of the to-be-detected object based on the density and the direction of the magnetic flux passing through the sensor 7, and detects the position.

This output signal is a signal linearly changing in proportion to a change of the position thereof as stated above.

In the above-described position detection, the arrangement of the generator 5 adjacent to the second magnetic substance 2 increases the magnetic attraction generated by the magnetic force between the generator 5 and the second magnetic substance 2 adjacent to the generator, and tightly clings the generator 5 to the second magnetic substance 2, as well as increases the frictional force while sliding between the sliding portion 9 of the supporting member 8 and the sliding portion 10 of the holding member 4 mentioned above (in FIG. 1A). This prevents the magnetic field generator 5 from being swung by external vibrations.

As described above, in principle, the position detecting device detects the position of the to-be-detected object from a change in the magnetic field. Therefore, in certain cases, an interference exerted by an external magnetic field cannot be disregarded.

Thus, when the external magnetic field is large and the influence thereon cannot be neglected, suitable measures are required.

Figure 3A:
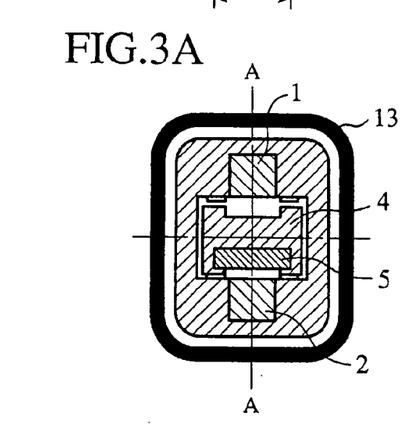
FIG. 3A is a lateral cross sectional view of the position detecting device protected against an external magnetic field in a first embodiment.
Figure 3B:
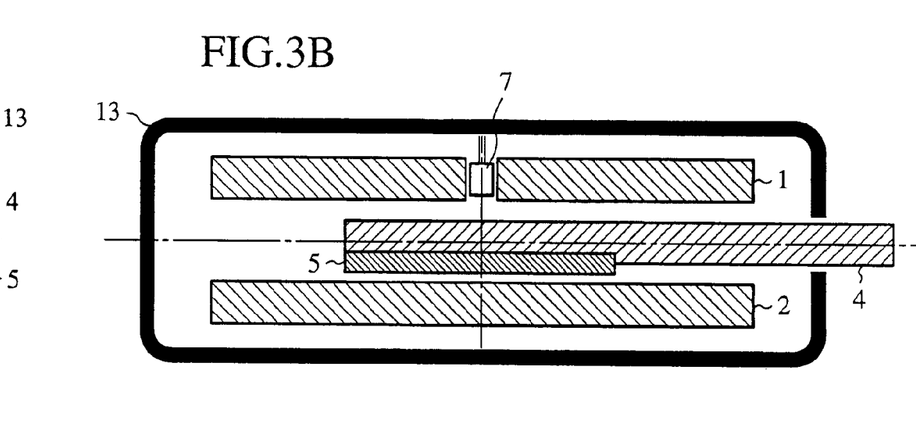
FIG. 3B is a longitudinal cross sectional view taken along the A—A line of FIG. 3A.

FIG. 3A is a lateral cross sectional view of the position detecting device taken necessary measures against an external magnetic field. FIG. 3B is a longitudinal cross sectional view taken along the A—A line of FIG. 3A. The same components as those in FIG. 1A and FIG. 1B are designated by same reference numerals for brevity's sake.

As shown in FIGS. 3A and 3B, enclosing the entire position detecting device with a casing 13 made of magnetic substance enables the inside of the magnetic field circuit to be isolated from the external magnetic field, and to be prevented from being influenced by the external magnetic field.

The applications of the position detecting device will now be described below.

The position detecting device described above can be applied to position detection of the on-board valve of an EGR-valve, and position detection of an arm of an air actuator, for example.

Figure 4:
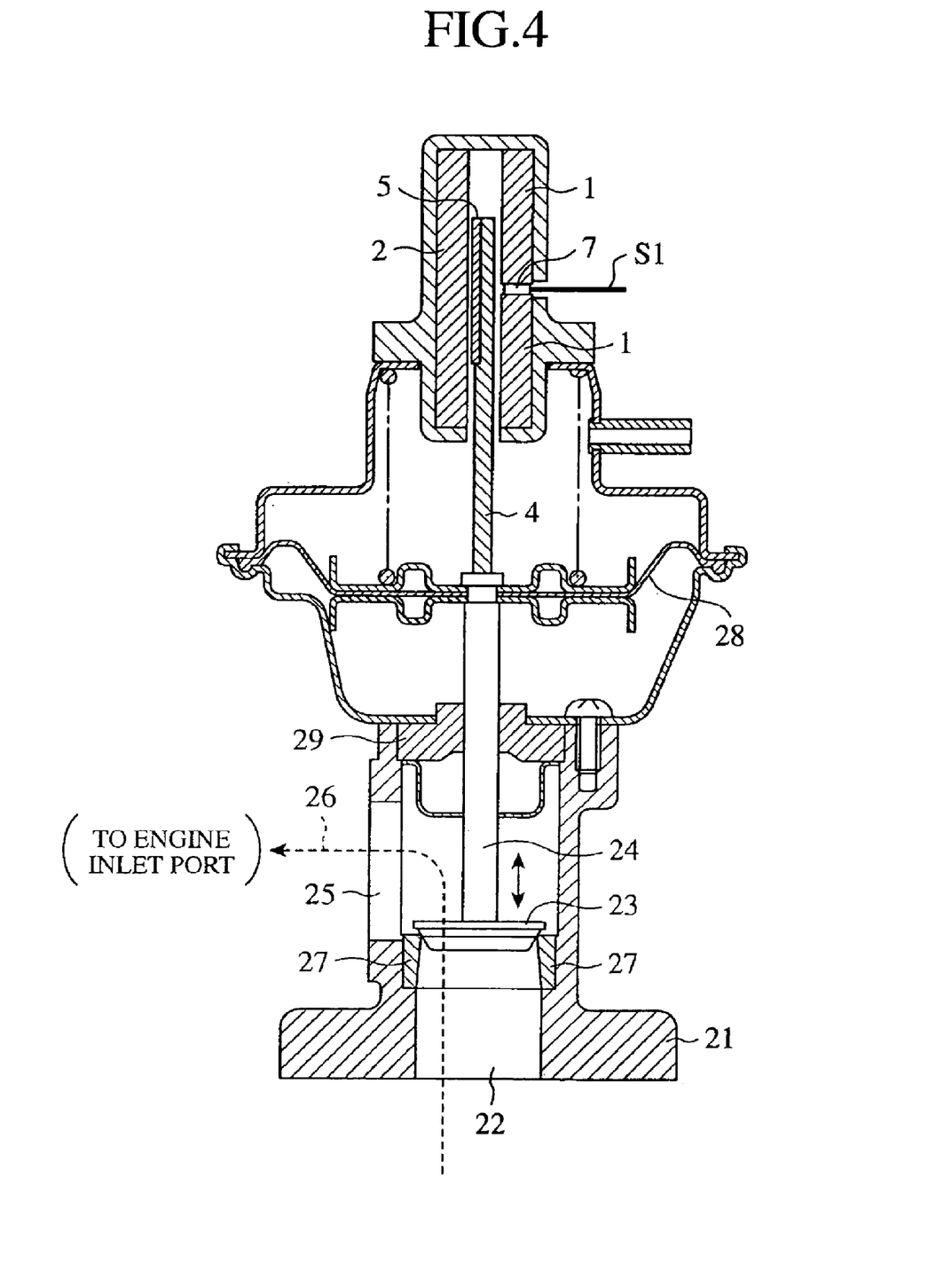
FIG. 4 is a longitudinal cross sectional view of an EGR-valve to which the position detecting device according to a first embodiment is applied.

FIG. 4 is a longitudinal cross sectional view of an EGR-valve of these applications. For better understanding, the same components as those in FIG. 1A and FIG. 1B are designated by same reference numerals for brevity's sake.

The EGR-valve is for controlling the amount of a return of exhaust gas by a valve when a part of the exhaust gas is returned to the intake side of the engine.

In FIG. 4, an inlet 22 is formed on the lower side of the main body 21 of a valve case and a valve 23 is provided in the inside of the inlet 22. A valve stem 24 is connected with the valve 23, and the valve stem 24 vertically moves as indicated by an arrow of FIG. 4 to vertically move similarly the valve 23. When the valve 23 moved upward, the valve opens. Meanwhile, when the valve moved to the lowermost position, the valve abuts a valve seat 27 and the valve 23 closes. Therefore, the larger the upward movement of the valve, the larger the opening of the valve 23 is, which results in an increase of the exhaust gas 26 flowing from the inlet 22 to an outlet 25. Exhaust gas 26, flowed to the outlet 25, is led to the intake port of the engine (not shown).

The valve stem 24 connected with the valve 23 are connected with a diaphragm 28, and at the intermediate position of the valve stem 24 a bearing 29 is provided for slidably supporting a vertical motion of the valve stem 24, and for preventing a leakage of the exhaust gas 26.

The holding member 4, which constitutes the position detecting device, abuts on the connecting point of the valve stem 24 and the diaphragm 28.

The position detecting device shown in FIG. 4 is just the one shown in FIG. 1A and FIG. 1B, and one side of the holding member 4 is made movable and the other side of the first magnetic substance 1 and the second magnetic substance 2 is fixed in position. The magnetic field generator 5 secured to the holding member 4 is arranged adjacent to the second magnetic substance 2, and the magnetic sensor 7 is provided in the first magnetic substance 1.

The magnetic sensor 7 outputs a signal S1 for position detection.

What is the subject of the position detection shown in FIG. 4 is an opening or a closing of the position of the valve 23, which determines the amount of return of the exhaust gas 26. The holding member 4 vertically moves interlocking with a vertical movement of the valve stem 24, and the magnetic sensor 7 outputs the signal S1 indicative of the position of the valve 23 according to the vertical movement of the holding member. In other words, the output signal S1 of the magnetic sensor 7 indicates the amount of return of the exhaust gas.

In the EGR-valve described above, the magnetic attraction generated by a magnetic force between the generator 5 and the second magnetic substance 2 adjacent to the generator increases on the ground that the generator 5 is arranged adjacent to the second magnetic substance 2, the generator 5 tightly clings the second magnetic substance 2, as well as increases a frictional force while sliding between the sliding portion 9 of the supporting member 8 and the sliding portion 10 of the holding member 4. This prevents the magnetic field generator 5 from being swung by external vibrations.

As mentioned above, through the claimed arrangement according to the first embodiment, in which the holding member 4, by which and to which the magnetic field generator 5 is held and secured such that the generator is arranged adjacent to either of the first magnetic substance 1 and the second magnetic substance 2, is provided in the gap 3 between these magnetic substances supported by the supporting member 8, the claimed arrangement increases the magnetic attraction generated by the magnetic force between the generator 5 and the first magnetic substance 1 or the second magnetic substance 2 adjacent to the generator, thereby tightly clinging the generator 5 to the first magnetic substance 1 or the second magnetic substance 2, as well as increasing the frictional force while sliding between the sliding portion 9 of the supporting member 8 and the sliding portion 10 of the holding member 4. As a result, even when applied a vibration from the outside, the generator 5 is prevented from being swung in a direction parallel to the position detecting direction and also in a direction parallel to the direction in which the component of the magnetic force of the generator 5 is generated. Thereby, the magnetic sensor 7 outputs a high-precision signal to prevent the position from being detected falsely, and the generator 5 can be secure from a collision against members such as the first magnetic substance 1 and the second magnetic substance 2, which averts damage to the generator 5.

In addition, an increase in the magnetic attraction due to the proximate arrangement of the generator 5 requires to slide between the sliding portion of the supporting member 8 and the sliding portion of the holding member 4 only on one side of the first magnetic substance 1 or of the second magnetic substance 2, adjacent to which the generator 5 is arranged. This relaxes the requirements for the strict dimensional accuracy of the height H1 of the holding member 4 or the gap H2 between the holding member 4 and the supporting member 8 shown in FIG. 1A, and eliminates the necessity of the high dimensional accuracy of the holding member 4 and the supporting member 8. This facilitates the manufacture of these members, which enables the provision of the high productivity, good for mass production, and inexpensive position detecting devices.

Furthermore, the sliding portion 9 of the supporting member 8 and the sliding portion 10 of the holding member 4 is slid via their sliding parts formed of resinous material with enhanced sliding characteristics of the supporting member and the holding member.

Second Embodiment

Figure 5A:
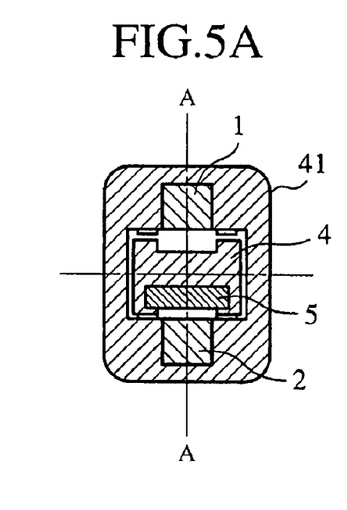
FIG. 5A is a lateral cross sectional view of a position detecting device according to a second embodiment of the present invention.
Figure 5B:
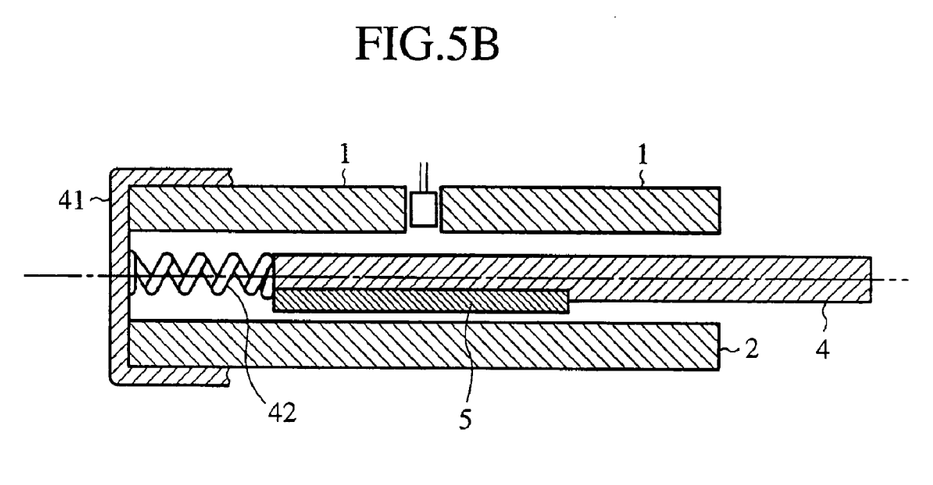
FIG. 5B is a longitudinal cross sectional view taken along the A—A line of FIG. 5A.

FIG. 5A is a lateral cross sectional view of a position detecting device according to the second embodiment of the present invention. FIG. 5B is a longitudinal cross sectional view taken along the A—A line of FIG. 5A. The magnetic field generator 5 is arranged adjacent to the second magnetic substance 2 in the same way as the first embodiment. The same components as those in FIG. 1A and FIG. 1B are designated by same reference numerals, and an explanation thereof is omitted for brevity's sake.

As described in the first embodiment, the position detection of the object is possible whatever the to-be-detected object abuts on the first magnetic substance 1 and the second magnetic substance 2 side or the holding member 4 side to which the generators 5 is secured.

On the other hand, the position detecting device according to the second embodiment is arranged, on the assumption that the to-be-detected object abuts on the holding member 4 side, such that the holding member 4 is made movable and the first magnetic substance 1 and the second magnetic substance 2 are fixed in position.

In this configuration, as shown in FIG. 5B, for example, an elastic body such as a spring 42 is provided between the supporting member 41, which supports the first magnetic substance 1 and the second magnetic substance 2, and the holding member 4. The holding member 4 is urged in the direction where the to-be-detected object exists by the elastic body such as the spring 42. This urge can continuously press the holding member 4 to which the generator 5 is secured against the to-be-detected object, which enables the position detection of the object without purposely connecting the holding member 4 with the to-be-detected object. Alternatively, the above-mentioned elastic body is not necessarily limited to the spring 42, and may be a component equivalent to the spring 42.

As mentioned above, through the claimed arrangement according to the second embodiment, the position detecting device is arranged such that the elastic body such as the spring 42 is provided between the supporting member 41, which supports the first magnetic substance 1 and the second magnetic substance 2, and the holding member 4, and the holding member 4 is urged in the direction where the object exists by the elastic body such as the spring 42, the claimed arrangement can continuously press the holding member 4 to which the generator 5 is secured against the to-be-detected object. Accordingly, this enables the position detection of the to-be-detected object without purposely connecting the holding member 4 with the object.

Third Embodiment

Figure 6:
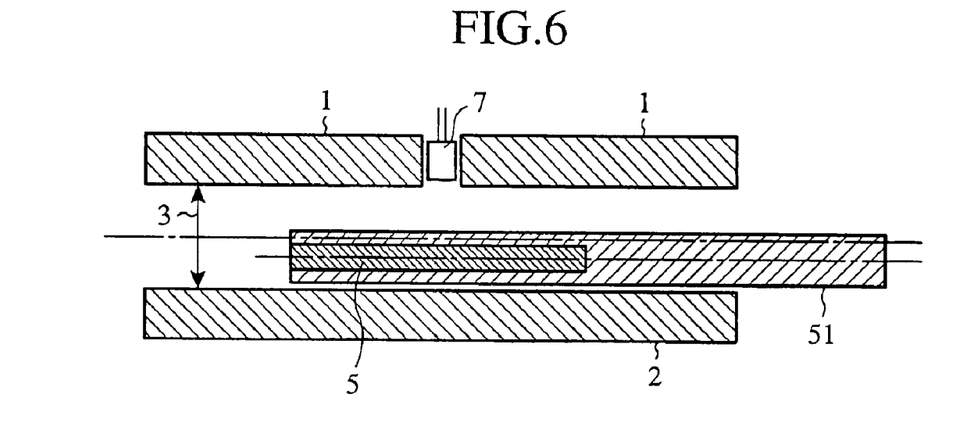
FIG. 6 is a longitudinal cross sectional view of a position detecting device according to a third embodiment of the present invention.

FIG. 6 is a longitudinal cross sectional view of a position detecting device according to the third embodiment. In this configuration, the magnetic field generator 5 may be arranged as with the first embodiment adjacent to the first magnetic substance 1. The same components as those shown in FIG. 1A and FIG. 1B are designated by same reference numerals, and an explanation thereof is omitted for brevity's sake.

In the first and second embodiments, the magnetic field generator 5 is secured to the holding member 4 so as to be adjacent to the first magnetic substance 1 or the second magnetic substance 2, and the holding member 4 itself is disposed in the center of the height direction of the gap 3 between the first magnetic substance 1 and the second magnetic substance 2. Therefore, in as far as the positional relationship between the holding member 4 and the generator 5 is concerned, the generator 5 is located off the central position of the holding member 4 and situated the downward side as shown in FIG. 1B or FIG. 5B.

In contrast to this, as shown in FIG. 6, in the position detecting device according to the third embodiment, the generator 5 is secured to the central position in the thickness direction of the holding member 51 by insert-molding the generator 5 therein, and the holding member 51 to which the generator is secured is arranged adjacent to the second magnetic substance 2.

The above-mentioned configuration also allows the generator 5 to be arranged adjacent to the second magnetic substance 2 to increase a magnetic attraction between the generator 5 and the second magnetic substance 2. This exhibits the same effect as with the first embodiment.

As mentioned above, through the claimed arrangement according to the third embodiment, the magnetic field generator 5 is inserted in the central position in the thickness direction of the holding member 51 and is secured thereto, and the holding member 51 to which the generator is secured is arranged adjacent to the first magnetic substance 1 or the second magnetic substance 2, the claimed arrangement increases the magnetic attraction between the magnetic field generator 5 and the first magnetic substance 1 or the second magnetic substance 2 as in the first embodiment with produced the same effect as the with the first embodiment.

What is claimed is:

1. A position detecting device comprising:
    a first magnetic substance and a second magnetic substance arranged opposite to each other with a gap left therebetween, and supported by a supporting member;
    a magnetic field generator arranged adjacent to the first magnetic substance or the second magnetic substance in the gap, for forming a magnetic path with these first magnetic substance and second magnetic substance;
    a holding member that holds and secures the magnetic field generator thereon, and is made movable relative to the first magnetic substance and the second magnetic substance; and
    a magnetic sensor inserted in the gap formed in the first magnetic substance or the second magnetic substance, for outputting a signal representative of a relative positional relationship among the first magnetic substance, the second magnetic substance, and the holding member based on magnetic flux passing through the magnetic path that undergoes a change due to a relative shift therebetween,
    wherein the magnetic field generator is moveable in a longitudinal direction with respect to said first magnetic substance and said second magnetic substance.

2. The position detecting device according to claim 1, wherein the holding member is made movable relative to the first magnetic substance and the second magnetic substance that are fixed in position.

3. The position detecting device according to claim 1, wherein the first magnetic substance and the second magnetic substance is made movable relative to the holding member that is fixed in position.

4. The position detecting device according to claim 1, wherein the supporting member and the holding member are slid via resins each provided on the supporting member and the holding member on the side to which the magnetic field generator stands close.

5. The position detecting device according to claim 1, wherein the holding member is made of non-magnetic material and the magnetic field generator is secured to the holding member by adhesive.

6. The position detecting device according to claim 1, wherein the holding member is made of non-magnetic material, and the magnetic field generator is buried and secured in the holding member by insert molding.

7. The position detecting device according to claim 1, wherein the holding member is made of non-magnetic material and has elasticity, and the magnetic field generator is secured to the holding member by an elastic force of the holding member.

8. The position detecting device according to claim 1, wherein the holding member is made of non-magnetic material, and the magnetic field generator is secured to the holding member by deforming the holding member after the magnetic field generator is fitted in the holding member.

9. The position detecting device according to claim 1, wherein an elastic body is provided for urging the first magnetic substance and the second magnetic substance or the holding member that relatively moves to the to-be-detected object side.

10. The position detecting device according to claim 2, wherein an elastic body is provided for urging the first magnetic substance and the second magnetic substance or the holding member that relatively moves to a to-be-detected object side.

11. The position detecting device according to claim 3, wherein an elastic body is provided for urging the first magnetic substance and the second magnetic substance, or the holding member that relatively moves to a to-be-detected object side.

* * * * *